United States Patent

Blachere et al.

[15] 3,698,724
[45] Oct. 17, 1972

[54] SEALING DEVICE

[72] Inventors: Robert Blachere, Meyrargues; Michel Sauvage, Aix-en-Provence, both of France

[73] Assignee: Commissariat A L'Engergie Alomique, Paris, France

[22] Filed: Nov. 12, 1969

[21] Appl. No.: 875,623

[52] U.S. Cl. ....................277/34.3, 220/46, 176/79
[51] Int. Cl. ........................F16j 15/46, G27b 33/00
[58] Field of Search ......277/34, 34.3, 34.6; 220/46 P; 176/79, 87

[56] References Cited

UNITED STATES PATENTS 2,775,869 1/1957 Pointer .................277/34.3 X
3,514,115 5/1970 Gallo ........................277/34.3

*Primary Examiner*—Samuel B. Rothberg
*Attorney*—Cameron, Kerkam & Sutton

[57] ABSTRACT

The sealing device particularly adapted to provide a pressure-tight passageway for rotating or sliding parts, comprises inflatable seals which can be easily replaced without any interruption of leak thightness. The inflatable seals are each placed in a groove of a rigid support which can be displaced longitudinally between different positions in each of which at least one seal is in contact with each part and one other is freed and can be replaced.

6 Claims, 3 Drawing Figures

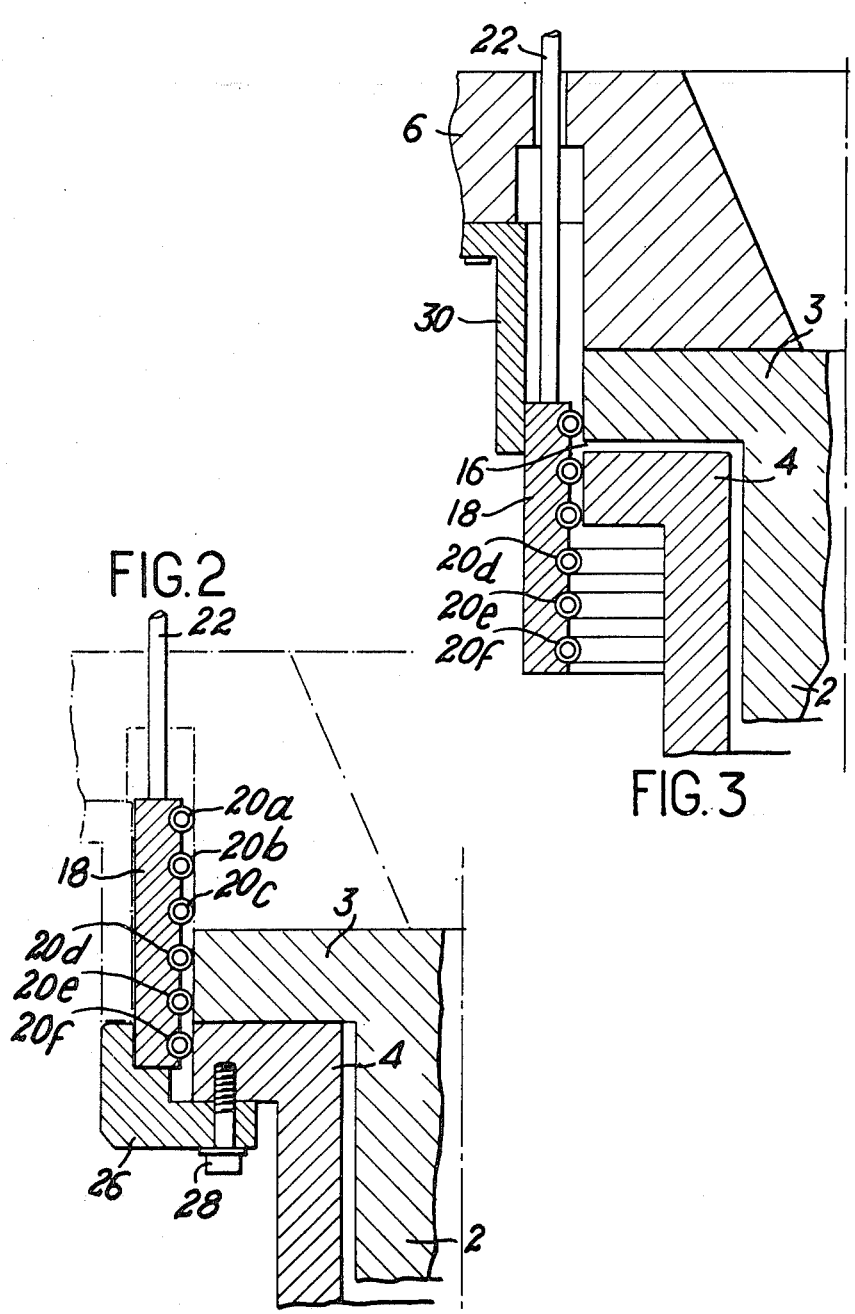

SEALING DEVICE

This invention relates to a device for forming a leak-tight seal between two parts, said device being particularly well suited to the application in which it is employed to provide a pressure-tight passageway for rotating or sliding parts even while these latter are in motion.

Leak-tightness of moving parts is usually obtained by means of inflatable seals formed of elastomer or any like material which have particularly high resistance to movements of rotation and which are also suitable for carrying out certain sliding movements. However, seals of this type often lose their effectiveness under the action of ageing which results from high temperature, corrosion, irradiation or other causes. In order to permit extended service of the device, it must therefore be possible to replace the seals periodically.

This invention is intended to meet the above-mentioned requirement by providing a sealing device in which the inflatable seals can be displaced with respect to the parts to be made leak-tight, thereby permitting the replacement of said seals, for example, while avoiding any interruption of leak-tightness.

The invention is directed to a device which comprises a rigid support provided on the face located in front of the line of separation of the parts to be sealed with at least four uniformly spaced parallel grooves having a distance between axes which is smaller than the thickness of each of said parts to be sealed, an inflatable seal in each of said grooves and means for carrying out the longitudinal displacement of said support in front of the parts to be sealed between different positions in which leak-tightness is always ensured by contact between at least one seal and each of said parts whilst any number of seals is freed from said parts and made accessible.

The mere displacement of the rigid support makes it possible by modifying the positions of the inflatable seals to change the seals which ensure leak-tightness without thereby impairing this latter at any moment; thus, one seal comes into contact with the part before the adjacent seal has moved away from this latter. The seals can be moved successively away from the parts to be sealed, thereby permitting ready access and convenient replacement.

In accordance with a further property of the invention, the rigid support is traversed by ducts for admitting a fluid under pressure into the spaces which are formed between the seals.

Leak-tightness is thus completed by the action of pressure between the seals and, no matter which seals may be in contact with the parts, this action can be maintained but can also be interrupted at any moment.

Further properties and advantages of the invention will in any case be brought out by the following description of one form of construction of the device in its application to leak-tightness between the rotary seal plug of a nuclear reactor and the plug support, although it will be clearly understood that this form of construction is given solely by way of example and not in any sense by way of limitation.

The construction of a sealing device of this type is shown diagrammatically in the accompanying drawings, in which:

FIGS. 2 and 3 are fragmentary longitudinal sectional views showing the device in the position of replacement respectively of the upper seals and lower seals.

Figure 1:
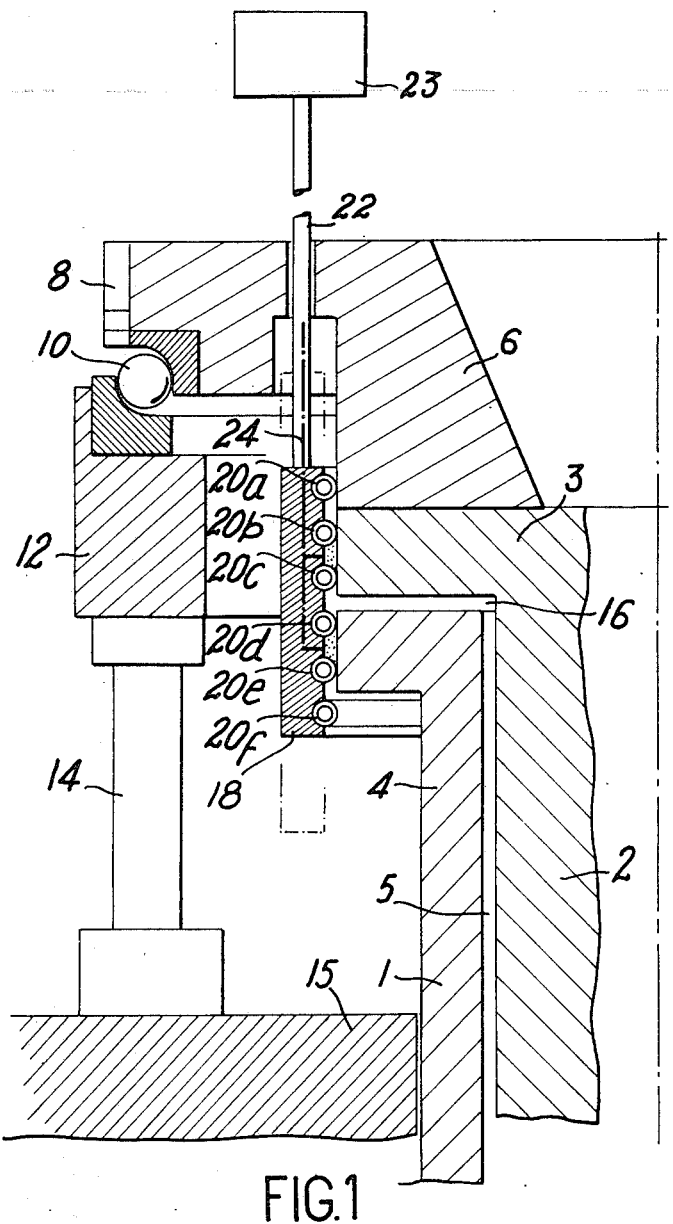
FIG. 1 is a fragmentary axial sectional view of the device in the position of operation of the reactor.

As shown in FIG. 1, the nuclear reactor which is thus illustrated comprises a tank 1 which is intended to contain the reactor core and provided at the top of said tank with an opening 5 which is closed by a rotary seal plug 2. Said plug has a peripheral annular projection 3 which is parallel to the top face of the rim 4 of the tank and separated from this latter by a small space 16 which permits rotation of the plug. There is mounted on the plug 2 and annular flange 6 which is supported externally of the plug by a ball bearing 10 and packing blocks 12 on columns or preferably on jacks 14 which in turn rest on a flat support structure 15. The flange 6 is also provided at its periphery with a toothed annulus 8 which is in mesh with a device (not shown in the drawings) for driving the plug in rotation and controlling the motion of the seal plug relative to the reactor tank 1. At the time of this rotational motion, the support columns and packing blocks remain motionless whilst the flange and the plug rotate within the opening 5 of the tank.

The space 16 which is formed between the plug and its bearing rim 4 must be strictly sealed off in order to prevent any contaminated fluid which is contained in the reactor tank from leaking to the surrounding atmosphere and this leak-tightness must be strictly maintained whatever displacements may be carried out by the plug.

With this object in view and in accordance with the invention, a rigid ring 18 which is coaxial with the bearing rim 4 and with the plug 2 is mounted in front of the lateral face of said bearing rim 4 and annular projection 3 and is adapted to carry seals 20 which are tightly applied against these two members. Said seals 20 are of the inflatable type and are placed within semi-cylindrical grooves which are formed at uniform intervals in one of the faces of the ring 18.

In the example of construction which is illustrated in the drawings, the seals 20 are six in number and spaced at a distance which is slightly smaller than the thickness of the annular projection 3 or of the rim 4; as shown in FIG. 1, two seals are in contact with the annular projection 3 and two other seals are in contact with the bearing rim 4. The space 16 is hermetically closed and leak-tightness of the reactor is ensured.

The seal-support ring 18 is also rigidly fixed to rods 22 which traverse the annular flange 6 and are coupled externally of this latter to driving means 23 for carrying out a longitudinal displacement of said ring in front of the annular projection 3 and the bearing rim 4 and for adjusting the position of the ring with respect to the space 16.

In addition, ducts 24 are pierced within the ring 18 and extend through the rods 22 so as to connect the spaces between the seals 20 to a reservoir containing fluid under pressure. Leak-tightness is thus completed by the formation of a pressure chamber between the seals and more especially between those seals which are in contact with the parts to be sealed. Said pressure chamber has the effect on the one hand of preventing any danger of leakage of fluid from the space 16 towards the exterior and on the other hand or preventing any external fluid from penetrating into said space.

In the form of construction which is illustrated in FIG. 1, the central seals 20b and 20c are in contact with the member 3 and the seals 20d and 20e are in contact with the member 4. It is wholly apparent that the same degree of leak-tightness could be obtained if the ring 18 were moved downwards so that the upper seals 20a and 20b are then in contact with the annular member 3 whilst the seals 20c and 20d would in that case be in contact with the bearing rim 4 and, similarly, if the ring were moved upwards so that the lower seals 20c, 20d and 20e, 20f are accordingly in contact with the two members whilst the other seals could be deflated if necessary.

The action of the stream of fluid under pressure is in any case only a complementary action and satisfactory leak-tightness could be ensured by contact between only one seal and each member, the degree of inflation of said seals being controlled so that the passage between the ring 18 and said members can be closed off completely. In the event of deterioration or damage to any one of the seals, it is thus possible to restore effective leak-tightness by means of a suitable displacement of the ring 18.

As a result of such displacement, those seals which are not in service are freed at the top or at the bottom of the two members 3 and 4. These seals may be deflated if necessary and can readily be removed and replaced without any interruption in the operation of the device itself.

This possibility of replacement of the seals is illustrated in greater detail in FIGS. 2 and 3.

In the form of construction which is shown, it is necessary in order to remove the upper seals to free these latter not only from the members 3 and 4 but also from the annular flange 6 and therefore to remove said flange in order to gain access to the seals.

To this end, the jacks 14 are lowered until the annular projection 3 of the plug 2 rests on the bearing rim 4, as shown in FIG. 2. On the other hand, the ring 18 is lifted so as to apply the lowermost seal 20f against said bearing rim 4 and to apply the seals 20d and 20c against the annular projection 3.

As shown in FIG. 2, the seals 20a, 20b and 20c are thus placed opposite to the annular flange 6. It is then necessary only to lock the ring 18 by means of clamps 26 which are secured, for example, by means of screws 28 beneath the rim 4 and then to separate the rods 22 from their actuating devices in order to permit the withdrawal of said annular flange 6. The seals 20a, 20b and 20c are then readily accessible and can be removed in order to be replaced by new seals.

The withdrawal of the lower seals is carried out in a similar manner as shown in FIG. 3: the ring 18 is lowered in order that the seals 20a on the one hand and the seals 20b and 20c on the other hand should be placed in contact with the two members 3 and 4 on each side of the space 16. The seals 20d, 20e and 20f are then free at the lower end of the carrier ring 18.

Clamps 30 which are fixed on the annular flange 6 maintain the ring 18 against the member 3 during withdrawal and replacement of said seals.

When the seals are so constructed that they can readily be joined in situ, it is an easy matter to insert them in the grooves of the carrier ring 18.

However, when the seals are formed beforehand, it is necessary to lower the jacks 14 so that the annular projection 3 rests on the bearing rim 4 and the annular flange 6 bears solely on the plug 2. The jacks as well as the packing blocks 12 can then be removed, thereby permitting the possibility of inserting the seals and fitting these latter in the grooves of the rings 18.

Whatever mode of operation is adopted, the space 16 is always closed on each side by means of at least one seal which is inflated so as to prevent any passage of fluid and consequently any communication between the interior of the tank and the surrounding atmosphere. Leak-tightness is thus wholly continuous irrespective of the position of the ring 18 and is maintained during the rotation of the plug 2, during replacement of the seals or simply during normal operation of the reactor.

It is wholly apparent that the form of construction which has just been described has been given only by way of example, that any other application of the sealing device could be contemplated and that a number of different modifications could in any case be made therein without departing either from the scope or the spirit of this invention.

What we claim is:

1. A sealing device for separate parts to be sealed comprising a rigid support, a face for said support opposite the line of separation of the parts to be sealed, at least four uniformly spaced parallel grooves in said face having a distance between axes smaller than the thickness of each of said parts to be sealed, an inflatable seal in each of said grooves and means for longitudinal displacement of said support with respect to the parts to be sealed between different positions while maintaining leak-tightness by contact between at least one seal and each of said parts, others of said seals being disengaged from said parts for accessibility.

2. A device according to claim 1, including ducts in said support for admitting a fluid under pressure into the spaces between said seals.

3. A device according to claim 1, said means including rods coupled to said support and to a device for displacement of said support.

4. A device according to claim 1 said support having six grooves, two of said seals in said grooves being in contact with each of said parts the others of said seals being out of contact with said parts.

5. A device according to claim 1, said rigid support having six seals, one seal being in contact with each part, the three end seals being disengaged from said parts for accessibility.

6. A sealing device providing leak-tightness between two annular projections on the rotary plug and on the tank, respectively, of a nuclear reactor, comprising a rigid support, actuating rods for said support for translational displacement of said support from the exterior of the reactor, a removable flange rigidly coupled for rotation with the rotary plug, said rods passing through said flange, six uniformly spaced parallel grooves in said support, an inflatable seal in each of said grooves, at least one of said seals being in contact with each of the projections to be sealed, the end seals being disengaged from the projections and accessible.

* * * * *